E. J. FARKAS.
TRACTOR WHEEL.
APPLICATION FILED AUG. 4, 1920.
1,416,949.
Patented May 23, 1922.
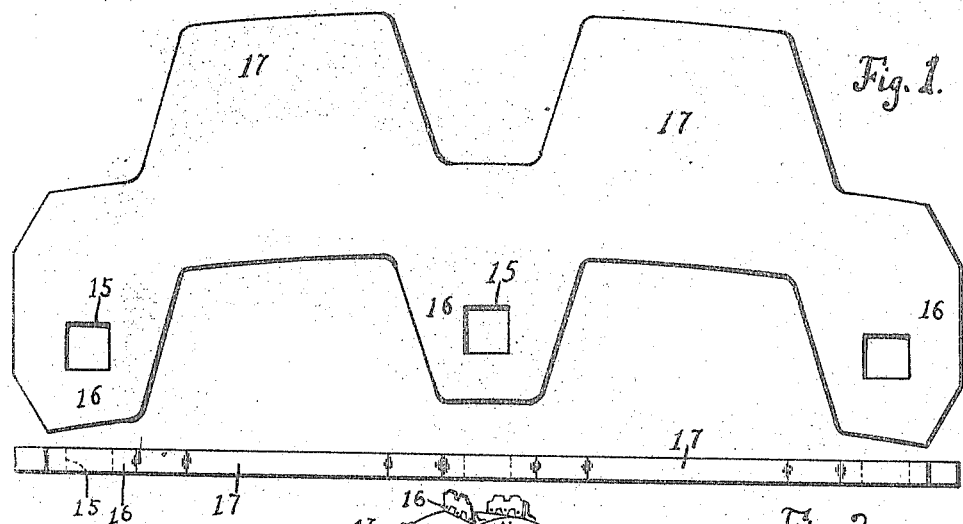
Fig. 1.
Fig. 2.
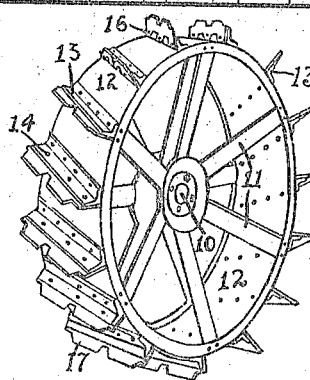
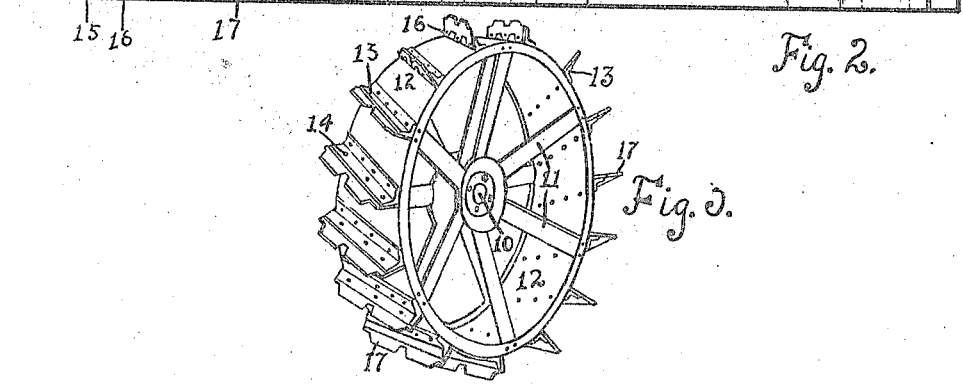
Fig. 3.
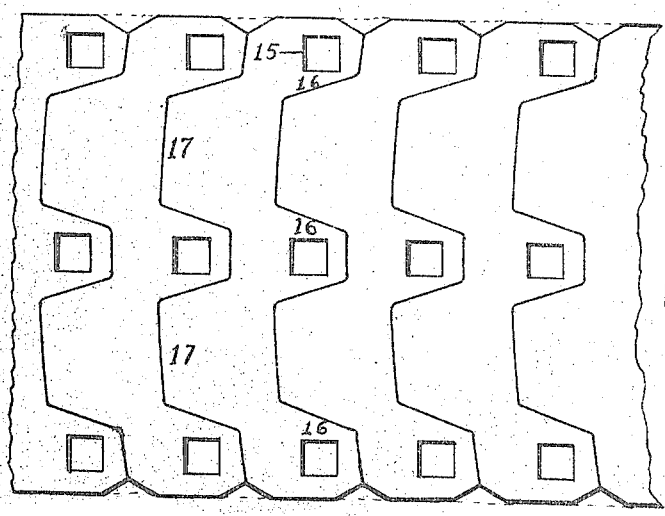
Fig. 4.
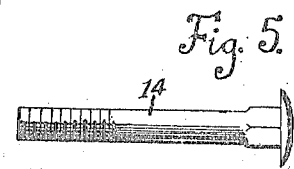
Fig. 5.
INVENTOR.
Eugene J. Farkas
BY
J. K. Harness.
ATTORNEY.

UNITED STATES PATENT OFFICE.

EUGENE J. FARKAS, OF DETROIT, MICHIGAN, ASSIGNOR TO FORD MOTOR COMPANY, OF DETROIT, MICHIGAN, A CORPORATION OF DELAWARE.

TRACTOR WHEEL.

1,416,949.  Specification of Letters Patent.  Patented May 23, 1922.

Application filed August 4, 1920.  Serial No. 401,269.

*To all whom it may concern:*

Be it known that I, EUGENE J. FARKAS, a citizen of the present domain of Hungary, having applied for and received my first papers for naturalization in the United States, residing at Detroit, in the county of Wayne and State of Michigan, have invented a new and useful Improvement in a Tractor Wheel, of which the following is a specification.

The object of my invention is to provide an improved tractor wheel of simple, durable and inexpensive construction.

A further object of my invention is to provide a tractor wheel which may be used under ordinary conditions of the soil and, in combination with such a tractor wheel, means for extending the lugs on the wheel so that they may give the necessary additional traction needed where the soil is extremely soft or sandy.

A further object of my invention is to provide a tractor wheel with auxiliary lugs whereby such lugs may enter further into the ground where greater traction is required, and to provide in combination with such lugs, means for fastening them to the lugs ordinarily provided with the tractor wheel. In connection with the fastening means it may be mentioned that great difficulty has been experienced in the past with detachable or extensible lugs due to the fact that they fill up or cake with soil so that it is very difficult to regulate or change the length of the lugs with which I am familiar.

A further object of my invention is to provide a detachable lug which may be secured to the lugs usually provided with the tractor wheel, with a minimum amount of labor and, also to provide such a lug formed so that it may be blanked from a strip of material with a minimum amount of waste.

With these and other objects in view, my invention consists in the arrangement, combination and construction of the various parts of my improved device, as described in the specification, claimed in my claims, and shown in the accompanying drawings in which:

Figure 1 shows an elevation of my improved auxiliary lug.

Figure 2 is a top view thereof.

Figure 3 is a perspective view of my improved tractor wheel with the auxiliary lugs mounted thereon.

Figure 4 is a view of a strip of material which indicates the manner in which the lugs are blanked therefrom, and Figure 5 shows part of the means for attaching the auxiliary lug to the fixed lugs of the wheel.

Referring to the accompanying drawings, I have used the reference numeral 10 to indicate, generally, the hub of the tractor wheel having spokes 11 and a periphery or rim 12. Mounted on the outer surface of the rim 12 in position spaced from each other are a plurality of lugs 13; these are the fixed or permanent lugs of the wheel and are formed by bolting or riveting one flange of an angle iron to the surface of the rim. These lugs are preferably placed with their longitudinal axis forming an acute angle with a plane through the axis of the wheel.

My improved auxiliary detachable lug is designed to be secured to the fixed lugs 13, and more especially to the outwardly extending flange of these lugs. I preferably secure them in place by passing bolts 14 through the squared openings 15 and other corresponding openings in the fixed lugs. Nuts are then screwed on the bolts 14 to hold the auxiliary lugs from movement relative to the fixed lugs. These bolts 14 are preferably formed with squared shanks adjacent to their heads so that the nuts may be screwed up without holding the head with a wrench due to the engagement of the squared portions of the bolt with the squared openings 15. The heads of the bolts are arcuate in cross section and do not have screw driver grooves therein, so that as the lug slides into the ground there will be little or no tendency for the dirt to catch on the head of the bolt and to pack around it. In other words, the head of the bolt is adapted to allow the earth to slide past it as far as possible thereby making that portion of the lugs what is termed, "self-cleaning".

In connection with the shape of my improved lug, it will be noted that it is cut off from a strip of material, each lug being the same in outline on its opposite edges, so that the lug may be formed by successive advances of a strip of material to position to be operated upon by the same die. It is also so formed that inwardly extending ears 16 receive the squared openings 15, and thereby may be termed "fastening ears", and outwardly extending ground engaging ears 17 are formed at the opposite edge of the lug. In this connection it will be noted that, due to the arrangement of these outwardly and inwardly extending ears or portions, it is possible to form a lug having a useful width which is much greater than the quotient of the length of the strip divided by the number of lugs formed therefrom. For example, in the use of any given strip, the useful width of the lugs may be six inches, yet it is possible to secure three lugs to the foot instead of two lugs, due to the shaping of the lug.

In the practical operation of my improved device a tractor wheel is formed, as described, with the fixed lugs 13 mounted thereon. If then it be advisable, due to the conditions of the soil, to have lugs of greater length on the tractor wheel than the lugs 13, then the auxiliary lugs may be bolted to the lugs 13 by placing the auxiliary lug with the openings 15 aligned with corresponding openings in the lug 13, then punching the bolts 14 through the openings, then screwing nuts on to the bolts to hold the auxiliary lugs in place.

Among the many advantages of my improved tractor wheel it may be mentioned that the wheel is adapted, because of the auxiliary lugs, to travel through and have traction in soil which would be impassible to the tractor having ordinary wheels. It is also possible to install the auxiliary lugs on the wheels, one at a time, so that they may be put in use at the time when they are most needed, namely, after the tractor has been mired by an unexpectedly soft piece of ground. In this connection it will be noted that the bolts are very readily tightened to hold the lugs in place due to the fact that the head need not be held and it may also be mentioned that where the tractor has been mired then it is only necessary to install enough of the auxiliary lugs to pull the tractor out of the hole. A further advantage resides from the fact that the auxiliary lugs are so shaped that they may be punched out of a continuous strip of material by a single die and that a large amount of material is saved in proportion to the width of the lug by the shaping of the edges thereof while the efficiency of the lug is not thereby impaired.

Some changes may be made in the arrangement and construction of the various parts of my improved device without departing from the spirit of the invention therein and it is my intention to cover by my claims such changes as may be reasonably included within the scope thereof.

I claim as my invention:

1. In a traction wheel, a lug attached to the periphery of the wheel, an auxiliary lug attached to said first lug having fastening ears and traction ears, the space between the fastening ears being of substantially the same size and shape as the traction ears.

2. A tractor wheel lug having one or more traction ears and two or more fastening ears, the distance between the fastening ears being substantially equal to the width of the traction ears.

EUGENE J. FARKAS.